United States Patent [19]
Chi et al.

[11] Patent Number: 5,706,489
[45] Date of Patent: Jan. 6, 1998

[54] METHOD FOR A CPU TO UTILIZE A PARALLEL INSTRUCTION EXECUTION PROCESSING FACILITY FOR ASSISTING IN THE PROCESSING OF THE ACCESSED DATA

[75] Inventors: Chi-Hung Chi, New Territories, Hong Kong; Hatem Mohamed Ghafir, Olney, Md.; Balakrishna Raghavendra Iyer, San Jose; Inderpal Singh Narang, Saratoga, both of Calif.; Gururaj Seshagiri Rao, Cortlandt Manor; Bhaskar Sinha, Elmhurst, both of N.Y.

[73] Assignee: International Business Machines Corporation, Armonk, N.Y.

[21] Appl. No.: 544,496

[22] Filed: Oct. 18, 1995

[51] Int. Cl.$^6$ ......................................................... G06F 9/38
[52] U.S. Cl. ........................................................... 395/569
[58] Field of Search .................................... 395/375, 569

[56] References Cited

U.S. PATENT DOCUMENTS

| | | | |
|---|---|---|---|
| 4,507,728 | 3/1985 | Sakamoto et al. | 395/800 |
| 4,831,515 | 5/1989 | Kamada et al. | 395/393 |
| 4,943,916 | 7/1990 | Asano et al. | 395/800 |
| 5,021,945 | 6/1991 | Morrison et al. | 395/392 |
| 5,051,940 | 9/1991 | Vassiliadis et al. | 364/736 |
| 5,101,344 | 3/1992 | Bonet et al. | 395/581 |
| 5,113,503 | 5/1992 | Sasaki et al. | 395/388 |
| 5,133,077 | 7/1992 | Karne et al. | 395/800 |
| 5,203,002 | 4/1993 | Wetzel | 395/800 |
| 5,226,164 | 7/1993 | Nadas et al. | 395/800 |
| 5,233,694 | 8/1993 | Hotta et al. | 395/391 |
| 5,237,668 | 8/1993 | Blandy et al. | 395/402 |
| 5,321,828 | 6/1994 | Phillips et al. | 395/500 |
| 5,355,457 | 10/1994 | Shebanow et al. | 395/394 |
| 5,410,685 | 4/1995 | Banda et al. | 395/183.14 |
| 5,495,587 | 2/1996 | Comfort et al. | 395/569 |

*Primary Examiner*—Parshotam S. Lall
*Assistant Examiner*—Kenneth R. Coulter
*Attorney, Agent, or Firm*—Marc A. Ehrlich; Bernard M. Goldman

[57] ABSTRACT

A method for obtaining parallel instruction execution (PIE) for frequently used programming operations, such as database record compression or expansion, cryptographic encoding/decoding, page moving, etc., for which a hardware-assist may be provided. These functions can be performed in parallel with CPU processing by a PIE processing facility (PIE-PF). The method is hardware/microcode based and uses software control in supervisory mode. The preferred embodiment is controlled by privileged subsystem software under an operating system, and does not use I/O channel oriented off-load processing. When the CPU is interrupted during an incomplete parallel operation by the PIE-PF, it is checkpointed in main storage in a manner accessible to the subsystem. The subsystem (after completing a current CPU operation, such as a database record predicate evaluation, can check for the completion of the PIE-PF operation by examining an indicator in a control block in shared storage. Furthermore, if the parallel operation has not completed, the CPU can: a) continue the PIE-PF processing in parallel with other processing in the CPU, b) halt the parallel PIE-PF asynchronous operation and have the CPU do the rest of the operation synchronously, or c) resume the parallel operation in the processor or a hardware assist if an interruption caused the PIE-PF parallel operation to be checkpointed.

13 Claims, 7 Drawing Sheets

FIGURE 2

```
      PIE-PARAMETER BLOCK (PPB) 210
     ---------------------------------
    0|                                |
     |    PPB-HEADER BLOCK (PHB) 215  |
    7|                                |
     |--------------------------------|
    8|    PPB-SPEC BLOCK (PSB) 225    |
     |                                |
   12|    PSB#0                       |
    /       :                        /
     |      :                         |
     |      :                         |
 1004|    PSB#249                     |
     |--------------------------------|
 1008|                                |
     |   PPB-RESPONSE BLOCK (PRB) 220 |
 1023|                                |
     ----------------------------------
      0 ........................... 31
```

FIGURE 3

```
PPB-HEADER BLOCK (PHB) 215
 _____
0| S 320  | /////  |      OPC 330       |
 |------------------------------------|
1|        INPUT REAL-ADDRESS 340       |
 |------------------------------------|
2|      /////   | INPUT LENGTH 350     |
 |------------------------------------|
3|        OUTPUT REAL-ADDRESS 360      |
 |------------------------------------|
4|      /////   | OUTPUT LENGTH 370    |
 |------------------------------------|
5|                                     |
 |       OPERATION PARAMETERS 380      |
6|                                     |
 |------------------------------------|
7|         ////////////////////        |
 _____
  0 ............................. 31
```

FIGURE 4

| S | MEANING |
|---|---|
| 00 | OPERATION IN PROGRESS |
| 01 | OPERATION INTERRUPTED |
| 10 | RESERVED |
| 11 | OPERATION COMPLETED |

FIGURE 5

| OPC | MEANING |
|---|---|
| X'0000' | TEST |
| X'0001' | HALT |
| X'0002' | RECORD-EXPAND |
| OTHERS | RESERVED |

METHOD FOR A CPU TO UTILIZE A PARALLEL INSTRUCTION EXECUTION PROCESSING FACILITY FOR ASSISTING IN THE PROCESSING OF THE ACCESSED DATA

INTRODUCTION

The invention relates to a Parallel-Instruction-Execution (PIE) Facility which enables overlap of processor instruction executions with other operations performed in parallel by a controlling processor.

BACKGROUND

The specification incorporates by reference into the subject specification the following prior-filed patent applications:

USA application (P09-93-036), Ser. No. 08/199,041 filed Feb. 18, 1994 entitled "Coexecuting Method and Means for Performing Parallel Processing in Conventional Types of Data Processing Systems", assigned to the same assignee as the subject application.

USA application (P09-93-013), Ser. No. 08/073,815 filed Jun. 8, 1993 entitled "Method and Means for Enabling Virtual Addressing Control by Software Users Over a Hardware Page Transfer Control Entity", assigned to the same assignee as the subject application.

USA application (P09-92-063), Ser. No. 08/012,187 filed Feb. 8, 1993 entitled "Load Balancing, Continuous Availability and Reconfiguration Control for an Asynchronous Data Facility", assigned to the same assignee as the subject application.

USA allowed application (P09-90-032), Ser. No. 07/704,559 filed May 23, 1991 entitled "Execution of Page Data Transfer by PT Processors and Issuing of Split Start and Test Instructions by CPUs Coordinated by Queued Tokens", assigned to the same assignee as the subject application.

USA application (P09-90-030), Ser. No. 07/816,917 filed Jan. 3, 1992 entitled "Asynchronous Co-processor Data Mover Method and Means", assigned to the same assignee as the subject application.

U.S. Pat. No. 5,237,668 (P09-89-018) issued Aug. 17, 1993 Ser. No. 07/424,797 filed Oct. 20, 1989 entitled "Processing Using Virtual Addressing in a Non-Privileged Instruction to Control the Copying of a Page of Data in or Between Multiple Media", assigned to the same assignee as the subject application.

SUMMARY OF THE INVENTION

The invention relates to a Parallel-Instruction-Execution (PIE) facility within a processing unit in a computing system, which enables the overlap of processor instruction executions with another operation performed in parallel in the same processor. From a software perspective, synchronous instructions and their operations are not overlapped with other instruction executions in the processor. An operation, described in this invention, is referred to as a PIE operation. A PIE operation may be initiated by a programming subsystem executing in a processor to off-load an operation that is to be executed in parallel.

From a software perspective, there is one PIE facility per processor. Although it may be implemented as a shared facility in hardware, management of this facility is also performed by hardware and microcode to enable each instruction processing unit to have one logical PIE facility, that belongs exclusively to that processor. Hence, logically, each PIE processor comprises a processing unit and a PIE facility, each having access to shared processor storage.

The PIE operation is requested and initiated by executing a new processor instruction. The PIE facility described for the preferred embodiment executes a processor instruction called Start Parallel Instruction Execution (SPIE). Operands of the SPIE instruction address a PPB (PIE parameter block). Processor execution control is returned to the subsystem when the instruction has executed to enable the subsystem to continue executing other instructions in the same processor while the requested PIE operation is being performed in parallel. Any long-running operation during which the software may do other useful work is a candidate to use this PIE facility.

Examples of PIE types of operations are compression, encryption, data conversion, moving information between storage hierarchies, etc. This invention, for example, may execute a specific operation, such as database record-expand operations, for ad-hoc queries against large databases. When the queries require records in the database in compressed form, the processing overhead to expand the accessed records with synchronous instructions is high. This invention enables such database subsystems to expand accessed records asynchronously using inexpensive processors, and thus greatly reduce the processing cost. Thus, the database subsystem processes the expansion of one record while the next record is being processed concurrently. Prior processors have available a synchronous compress instruction, and its execution cannot be overlapped with other instruction executions in the processor as is done in a PIE facility built according to this invention.

The prior Co-Processor in prior cited application Ser. No. 08/199,041 (P09-93-036) uses the Start Subchannel (SSCH) instruction which requires use of the CEC's I/O subsystem for its off-loading operations, and the Start Subchannel instruction can only be issued by an operating system (OS) control program service. On the other hand, this PIE invention does not require use of the I/O subsystem and may be initiated by programing subsystems without any OS intervention to off-load an operation within the CPU to be executed in parallel with continued CPU operations. The PIE operation is initiated by a new processor instruction, and when its execution is completed, CPU control is returned to the issuing subsystem, so that the subsystem may continue execution of its subsequent instructions in the same processor while the off-loaded operation is being performed.

Any long-running sequence of instructions may be off-loaded for execution under a PIE operation, during which the requesting software may continue execution and doing other useful work concurrently. Examples of long-running work items (which may be off-loaded for concurrent PIE operations) are compression, encryption, data conversion, moving pages between storage hierarchies, etc.

A programming subsystem executing on a processor may logically own a PIE facility that is integrated with that processor. However, the PIE facility may be implemented as shared hardware usable by all the instruction processors in the system.

SUMMARY OF THE DRAWINGS

FIG. 2 shows the format of a PIE Parameter Block (PPB). The PPB is a 4 KB block of storage on 4 KB boundary containing parameters for the SPIE instruction.

FIG. 3 illustrates the format of a header of the PIE Parameter Block (PPB), referred to as the PPB Header Block (PHB). This is a 32-byte block starting on a page boundary. All fields in this block marked with ///// are undefined and are reserved.

FIG. 4 shows the definition of bits 0-1 of word 0 contained in the PHB, referred to as the Operation Status (S) field: it specifies the status of the requested PIE operation at any instant in time. Bit combination of 10 (binary) is reserved for future use.

FIG. 5 shows the definition of bits 16-31 of word 0 contained in the PHB, referred to as an Operation Code (OPC). This field specifies the specific operation command to the PIE facility, initiated with the SPIE instruction. Three codes are defined.

FIG. 8A illustrates an example of a database tablespace scan operation for this PIE facility. In this example, a query predicate evaluation operation for a record I takes more time than the process of expanding the record. Thus, while record I is being evaluated, the next record is being expanded, such that when record I processing is complete, the next record (I+1) is already expanded and ready to be operated on.

SUMMARY OF APPENDIX

Table A codes a detailed method of using this PIE facility. It is explained with a specific example of a database subsystem performing a tablescan operation. In this method, the database records must be processed in order. This characteristic of the database query does not allow for the possibility of skipping a record whose expansion is still in progress asynchronously in the PIE facility.

Table B codes another detailed method of using the PIE facility. It is explained with a specific example of a database subsystem performing a tablescan operation. In this method, the database records may be processed out-of-order. This characteristic of the database query allows more use of the PIE facility than the case when records in a page must be processed in order. Here, it is possible to skip a record whose expansion is still in progress asynchronously.

DETAILED DESCRIPTION OF THE PREFERRED EMBODIMENT

Figure 1:
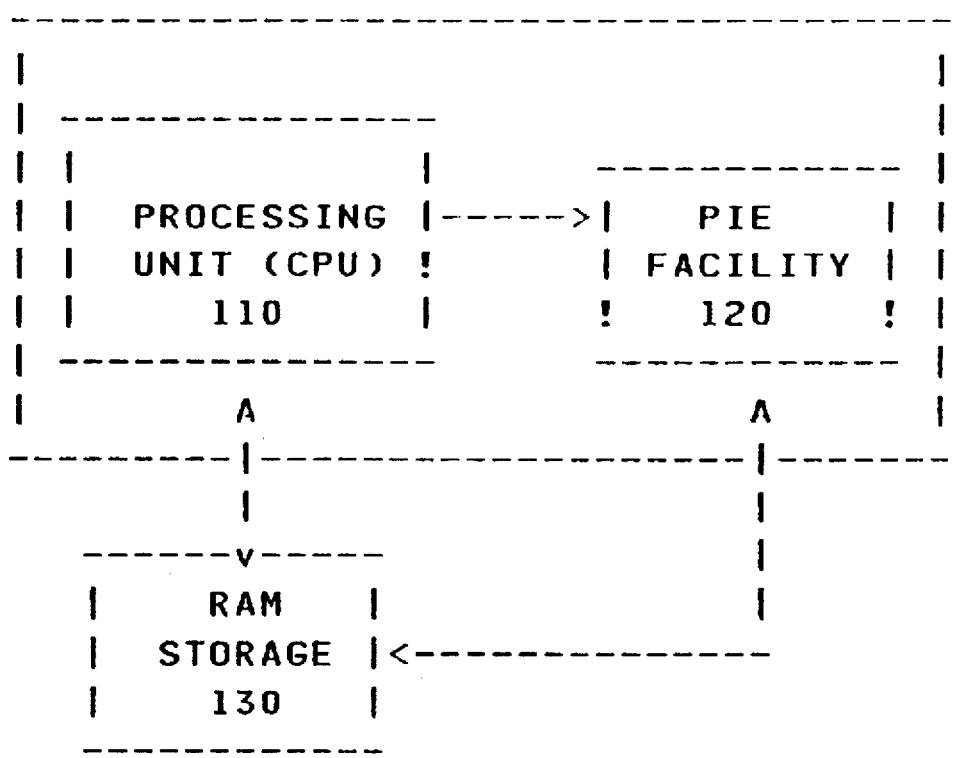
FIG. 1 illustrates a high-level functional representation of a Parallel Instruction Execution (PIE) facility.

FIG. 1 shows major elements of the preferred embodiment, which is a Processor 100 consisting of a Processing-Unit (CPU) 110 that may be a CPU such as one in IBM's S/390, and a Parallel-Instruction-Execution (PIE) facility 120. The CPU and the PIE facility can access random access (RAM) main storage 130 directly. Main storage 130 can be shared by multiple processors within a Central Electronic Complex (CEC), in which each processor 100 comprises a CPU 110 and a PIE facility 120.

From a software perspective, there is one PIE facility per processor. Management of each PIE facility must be performed by the hardware/microcode to enable each CPU to own one logical PIE facility that belongs only to that processor. However, this function could be implemented as a shared facility (e.g. one PIE facility 120 for plural processing units 110).

PIE facility 120 is a stateless machine—it is not possible to save any context in the machine from a previous operation. All states are saved in storage locations created and controlled by software.

The CPU 110 implements an instruction called Start-PIE (SPIE), which can execute any of several functions implemented in the PIE facility. The function to be performed and its associated parameters are communicated by the CPU to the PIE facility in an area in storage called the PIE-Parameter Block (PPB), as shown as 210 in FIG. 2. A header, referred to as the PPB Header Block (PHB) 215, is located in the PIE Parameter Block (PPB) 210. A PPB-Response Block (PRB) 220 communicates a response from the PIE facility for an operation just executed. The PRB 220 is returned in the PPB at the designated offset in the PPB.

FIG. 3 illustrates the format of PHB 215. This is a 32-byte block starting on a page boundary. All fields in this block marked with ///// are undefined and are reserved. FIG. 4 shows an Operation Status field S in PHB 215, which is a 2 bit status field of a requested PIE operation at an instant in time, as: operation in progress, operation interrupted or operation completed. One of the bit combinations (10 binary) is reserved for future use.

FIG. 5 shows the definition of an Operation Code field (OPC) in bits 16-31 of word 0 in the PHB, which specifies a specific operation command for the PIE facility, initiated by the SPIE instruction. The three operation codes: test, halt and record-expand are provided as examples, and other OPC commands may be used for other operations within the PIE facility, for example, encryption, data conversion, etc. Other bit combinations are reserved for future use.

The SPIE instruction is a privileged instruction, and in the preferred embodiment is put into the S/390 architecture, which implies that its SPIE instruction may only be executed by an operating system (OS), control-program, and/or subsystem software which execute in the S/390 supervisor state. An example of a software subsystem is IBM's S/390 DB2 (Data Base 2) management software which resides in random-access (RAM) storage 130. This software provides controlled and consistent access to large amounts of data, such as customer's bank records, insurance records etc.

One of the important aspects of this invention is that the subsystem software can invoke the PIE facility by executing the SPIE instruction directly, without assistance of any OS privileged code. In order to explain and appreciate the significance of this, examples of the use of the PIE facility are described herein.

In the preferred embodiment, the inventors view the functions implemented in the PIE facility as being simple. For example, the PIE facility may have logic to expand a compressed database record based on one of many algorithms available. For example, a customer accounts database of a large enterprise may contain millions of records. Processing of an ad-hoc query against such a large database may result in processing almost all records of the database, and an expand operation may be invoked very frequently. An inappropriate example is an Input/Output (I/O) model invoking the PIE facility to expand a record since the number of instructions to initiate an I/O operation through the control program and processing its interrupt may far outweigh the function performed in the PIE facility. For example, to expand an 80 byte compressed record may take only 320 instructions, but in an I/O model, it may take up to 5000 instructions.

The inventors contemplate other models, which are referred to as: A, B and C, but rejected them for different reasons. The reasons were: possible negative impact on system throughput, complexity to determine the completion of the SPIE operation in the PIE facility, and/or recovery logic which subsystem software may have to implement to use the asynchronous operations of the PIE facility.

Model B is similar to the Asynchronous Paging Facility in the prior art. With this model, the processor interrupts are disabled while the parallel operation in the PIE facility is in progress, ensuring that the process that executes the SPIE instruction does not get redispatched on to a different processor before the parallel operation is complete. In the prior art using this model, disabling of interrupts is done by the control program, and hence the instruction needs to be executed by the OS. In this invention, the SPIE instruction is executed by a subsystem without the assistance of the control program, and hence, with this model, execution of the instruction will involve disabling of interrupts by the processor hardware/microcode during the synchronous portion of the instruction execution, and enabling of the interrupts when the parallel operation is complete. This frequent disabling and enabling of interrupts by the hardware and/or microcode may significantly impact the system throughput, and hence, this model B is not recommended for using the PIE facility.

In model C, interrupts stay enabled during the execution of the parallel operation in the PIE facility, and the testing for completion is performed by testing storage. An operation-complete flag is in main storage which is created and accessible by the subsystem software, and this area is specific to the PIE facility during the SPIE instruction initiation. Since the storage location is known to the subsystem, test for completion of this operation may be done from any processor. However, the completion of the operation is non-deterministic, i.e, the subsystem software would have to set up a timer to check for the completion of the operation, and may also have to deal with complicated and performance degrading constructs for recovery of the parallel PIE operation.

This invention teaches a new model, in which interrupts are not disabled when the SPIE instruction is executed, and the parallel operation is in progress in the PIE facility. If the processor gets interrupted, the parallel operation executing in the PIE facility 120 also gets interrupted, and takes a checkpoint of the PIE operation in main storage 130. The major difference between this model and the previous models is that the parallel operation also gets interrupted in this model, and the interrupted task carries the status of the incomplete parallel operation along with it to the next processor on which it next gets dispatched.

Hence, the subsystem interrupted task, when redispatched (maybe on a different processor) will test main storage and determine that the PIE operation was interrupted before completion, and may choose to continue the operation by executing another SPIE instruction. For example, if the database record expand operation in the PIE facility got interrupted as a result of its CPU getting interrupted, the subsystem software may initiate the expand operation from where it had left off by providing the checkpointed PPB 210 associated with the interrupted operation in the SPIE instruction parameters. Mechanisms for checkpointing an interrupted process in storage are in the prior art. Hence, the concept of this invention can be extended to checkpointing a parallel operation when the task that initiated the parallel operation is interrupted in the processor.

In the preferred embodiment, the invention contemplates that the logic for the operations implemented in the PIE facility are also implemented as instructions in the CPU. Thus, the database record-expand operation may be executed in either the CPU 110 or the PIE facility 120. Also the CMPSC instruction can be executed in either the CPU or the PIE facility. This allows the program executing in the CPU to optionally transfer the execution to the PIE facility, so as to allow the CPU to avoid having to exapand records that may be done in the PIE facility, and to allow the CPU to pick up expansion processing which is checkpointed in the PIE facility due to having been halted there for some reason. The combined implementation of the CPU and a PIE facility is feasible and is simple, due to hardware packaging having made significant advances with dropping hardware costs.

The related CPU operations make extensive use of the PPB-Header Block (PHB) 210 in FIG. 3. It contains the Operation Status field (S) 320, the requested operation code field (OPC) 330, an input real address field 340 which locates from where bytes are to be fetched from the main store with an input length field 350, an output real address field 360 where the results of the operation are to be stored in the main store and its length 370, and an operation parameters field 380 for containing parameter of the operation.

Software in the CPU sets up contents of the fields in the PPB 210. For example, DB2 subsystem software in the CPU may set up the PPB OPC 330 to "Record-Expand" to expand a compressed database record. This includes setting up the main storage real address of the record in field 340 and setting up the length of the input record in 350, setting up an output area in main storage for the expanded record and providing its real address in field 360 with its maximum length in field 370. In field 380, other operation parameters are provided for the expand operation such as providing the address of a specific compression/expansion software routine.

Figure 6:
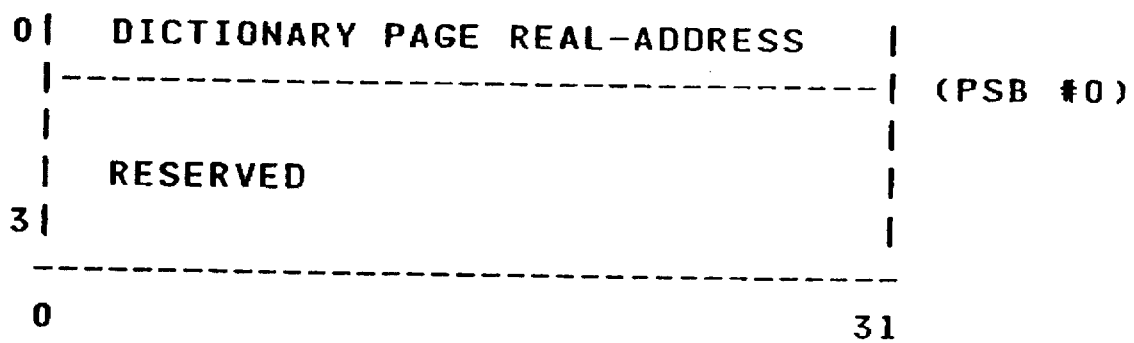
FIG. 6 illustrates the format of a PPB Specification Block, referred to as the PPB Specification Block (PSB). In the preferred embodiment, one PPB may contain a maximum of 250 PSBs. Each PSB is a 16-byte block, contents of which are shown in this Figure. Only one word in this block is defined.

Also, the PPB may contain the location and length of an expansion dictionary for a Ziv-Lempel type of compression algorithm commonly used in the industry and found in prior art. FIG. 6 shows a "dictionary page real-address" field 610 in each PPB-Specification Block (PSB) 225 contained in PPB 210, in the preferred embodiment, in which PPB 210 contains a number of PSBs—upto a maximum of 250 PSBs specified in one PPB. The number of valid PSBs may be contained in a PPB as determined by parameters in the operations being specified in the PPB 210.

Figure 7:
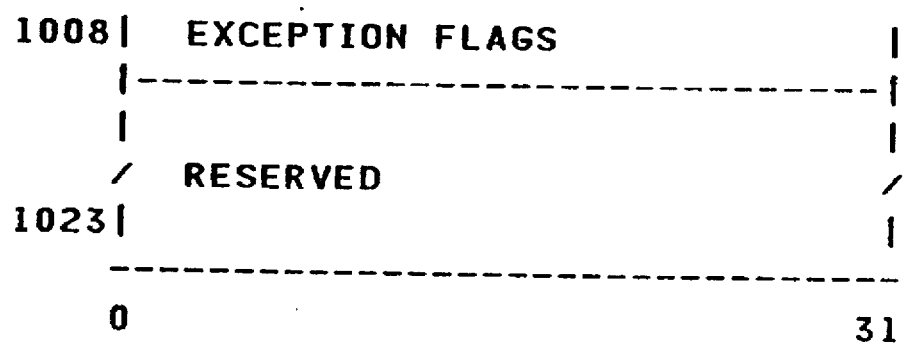
FIG. 7 illustrates the format of a PPB Response Block, referred to as the PPB Response Block (PRB). This construct is a 64-byte block located in words 1008 to 1023 of the PPB. The PRB contains status information related to the PIE operation request contained in a PPB. Only one word in this block is defined.

FIG. 7 shows the PPB-Response Block field (PRB) 710 which is part of PPB 210, in which the PIE facility stores a status response for a specific parallel operation. In the preferred embodiment, all zeros in this field indicate that the operation completed normally without any errors or exceptions. Otherwise, exception flags are stored in field 710 for indicating an abnormal condition for operation termination.

SPIE INSTRUCTION EXECUTION

Associated with each processor 100 in a CEC is one PIE facility 120, and associated with PIE facility 120 is one PIE-queue entry (PQE) in a queue being used to communicate a request of a SPIE instruction executed by processing unit 110 to its associated PIE facility 120. At any time, the PQE for a particular processor may be in any one of two states: "available" or "busy".

Operations of the SPIE instruction contains two execution parts: a "synchronous part" followed by an "asynchronous part". The synchronous part is used when the processing unit 110 available or busy. The asynchronous part is used only when the processing unit 110 and all its resources are available (free) to execute instructions. Some SPIE commands only use the synchronous part.

The processing of each of the three exemplary OPC commands (having OPC values of 0-2) are as follows:

OPC=0 for TEST COMMAND

This command is used by the subsystem software to determine the availability of the associated PIE facility 120 in a processor 100. This test occurs during the synchronous part of the execution of the SPIE instruction. The status of the PIE Queue Entry (PQE) for this processor is tested for the available/busy state. If available, a condition-code 0 is returned and posted in the PPB Response Block, and no other action is taken.

If the PQE for this processor is found in the busy state (as containing an entry for which processing is not complete), then a condition-code of 1 is returned, and no other action is taken.

If the processing unit is unable to determine the available/busy state of the PIE facility, then a condition-code other than 0 or 1 is returned.

There is no asynchronous part of the SPIE instruction execution with this command.

OPC=1 for HALT COMMAND

This command is used by the subsystem software to stop the operation of the PIE facility in that processor, if there is any operation in progress. During the synchronous part, if PQE for this processor is found in the available state, then control is returned to the software with a condition-code 0, and no other action is taken. If PQE for this processor is found in the busy state, the ongoing PIE operation is terminated, PPB for the terminated process is updated to reflect the current checkpoint and to record the fact that the process was interrupted, PQE for this processor is set to the available state, and the PIE facility for this processor waits for the next SPIE instruction from the associated processing unit. Control is returned to the software with a condition-code 1.

If the processor is unable to carry out this command of the PIE facility, then control is returned to the software with a condition-code other than 0 or 1. At this point, the processor is free and may continue with the execution of its next instructions.

There is no asynchronous part of the SPIE instruction execution of this command.

OPC=2 for RECORD-EXPAND COMMAND

This command is used by subsystem software to initiate a record-expand operation. During the synchronous part, if the PQE for this processor is found in the available state, then the processing unit 110 checks all PPB parameters. If all parameters check successfully, a PIE operation is enqueued in the PQE for expanding one record by the PIE facility 120. Information sent to the PIE facility with respect to this queue entry includes: the absolute address of the PPB, information in the PPB, and a storage key value in the processor PSW (program status word) at the time of this instruction execution. The PIE facility is tapped and control is returned to the software with a condition-code 0.

Thereafter, processing unit 110 is free and may be used for the execution of other SPIE instructions.

If the PQE for a processor is in the busy state, then control is returned to the processor software with a condition-code of 1, and no other action is taken.

If the processor is unable to carry out this command to this PIE facility 110, then control is returned to the software with a condition-code other than 0 or 1. The processor is free and may continue with the execution of other instructions.

If the synchronous part of SPIE execution returns a CC=0, the asynchronous part follows, in which the PIE facility 120 expands the specific record using the parameters available for this PQE (following the rules specified by the operation algorithm).

When the asynchronous operation is completed, successfully or unsuccessfully, Field S in PHB 215 is set to its 11 state, and the parameter addresses and lengths in the PHB are updated to reflect a current checkpoint, and appropriate exception flags are set in PRB field 710. Then, the PQE for this processor 100 is set to the available state, and the PIE facility 120 for this processor 100 waits for the next SPIE instruction execution by this processor.

During the asynchronous part of the execution of SPIE in the PIE facility 120, if the processing unit 110 gets interrupted, the PIE facility 120 for that processor is also interrupted. In this case, PHB<S> 410 is set to 01, the parameter addresses and lengths in PHB 310 are updated to reflect the current checkpoint, and the appropriate exception flags are set in PRB field 710. Then the PQE for this processor 100 is set to the available state, and the PIE facility 120 for this processor 100 waits for the next SPIE instruction execution in this processor.

Other OPC commands may be used for other operations within the PIE facility, for example, encryption, data conversion, etc.

USAGE EXAMPLES

Figure 8A:
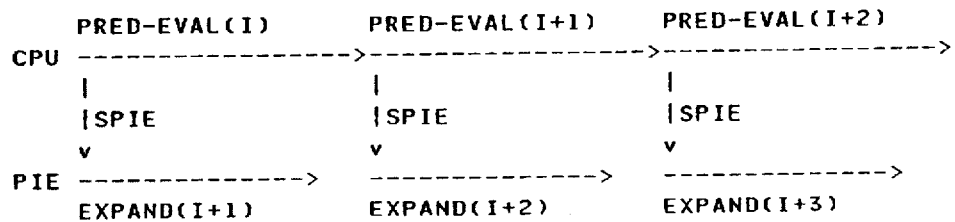

FIGS. 8A, B and C, 9, and 10, describe examples using the PIE facility for expanding database records in database management software, such as IBM's DB2 software subsystem which operates under the IBM MVS operating system. DB2 can manage large amounts of data, for example, it can handle up to 64 billion bytes in a single relational table. Such a table can consist of tens of millions of records. DB2 supports an option to compress this data in order to save the cost of disks and its attachment hardware. In several instances, such compression operations can reduce the cost of disks and their attachments by a significant amount.

Both the operating system (e.g. MVS) and the subsystem software (e.g. DB2) execute on the processing unit (CPU) 110 in FIG. 1.

In order to process DB2 query software against a data base containing compressed records, the data base records must first be expanded. Then, the DB2 query software in the CPU executes predicate evaluation code which accesses the contents of the uncompressed records and provides them to an end-user of the computer system.

The expansion of records requires heavy processor usage. If the CPU were to do the expansion, the availability of the CPU for other work would be significantly delayed, since the CPU is a shared resource of the computer system.

The PIE facility 120 enables offloading from CPU 110 of some specific functions, such as record-expansion, during which the CPU can, instead, be made available to perform other useful work in the system. The DB2 subsystem then will contain the SPIE instruction in its software to aid in the shifting of specific types of work from the CPU to the PIE facility 120, such as by executing the SPIE record expansion command.

As previously mentioned in the preferred embodiment, processor 110 can execute an instruction, referred to as CMPSC here, to perform a record-expansion operation in the processor of a compressed record accessed in a data base, in which case the CMPSC execution is performed synchronously with the CPU program executions. This invention enables the CMPSC, or its equivalent, to also be executed on the PIE facility 120 when invoked by the CPU executing the SPIE instruction's record expansion command. The record to be expanded is then identified by parameters in the PPB which is set up by the CPU and passed to the PIE facility 120 when invoked by the CPU executing the SPIE instruction's record expansion command.

The PIE facility in this application must be available when the CPU executes the SPIE instruction's record expansion command, since in this embodiment the PIE facility has no waiting mechanism to recognize a SPIE instruction has been requested by the CPU. Accordingly, the subsystem software on the CPU may preceed the execution of the SPIE instruction's record expansion command with a SPIE instruction's test command for determining the PIE facility is available before issuing the SPIE instruction's record expansion command. A periodic prior issuance of the SPIE instruction's test command may be done to test for PIE facility availability. A spin loop using the SPIE instruction's test command may be used, although it is more wasteful of the CPU resource.

Figure 8B:
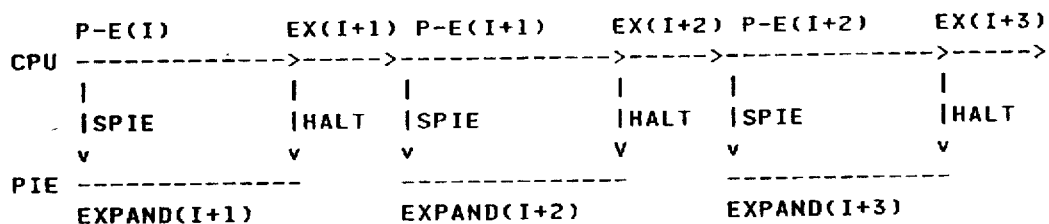
FIG. 8B illustrates an example of the asynchronous PIE operation, in this case a record expand operation, which is not complete when the operation on the previous record is complete. Here the processor, after completing the predicate evaluation on record I, halts the incomplete asynchronous PIE operation on record (I+1), and completes the incomplete expand operation synchronously in the processor. At that point, the next asynchronous PIE operation on record (I+2) is initiated, and at the same time, the predicate evaluation on record (I+1) is started in the processor.
Figure 8C:
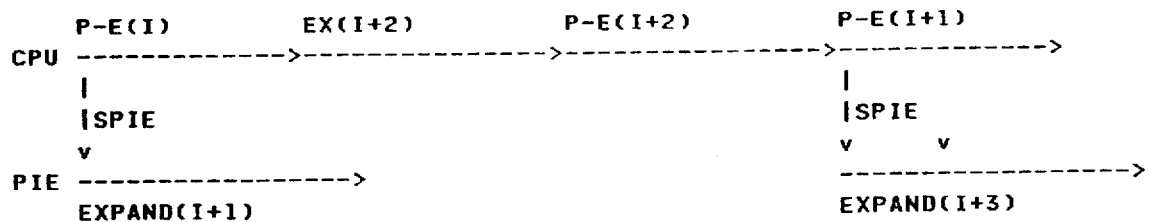
FIG. 8C also illustrates the case when the asynchronous PIE operation is not complete when the operation on the previous record in the processor is complete. Unlike the case in FIG. 8B, after predicate evaluation on record I, the predicate evaluation operation on record (I+1) is skipped, and the record (I+2) is expanded synchronously in the processor and then evaluated. At that point, the predicate evaluation on record (I+1) is started and the parallel operation of expanding record (I+3) is initiated in the PIE facility.
Figure 9:
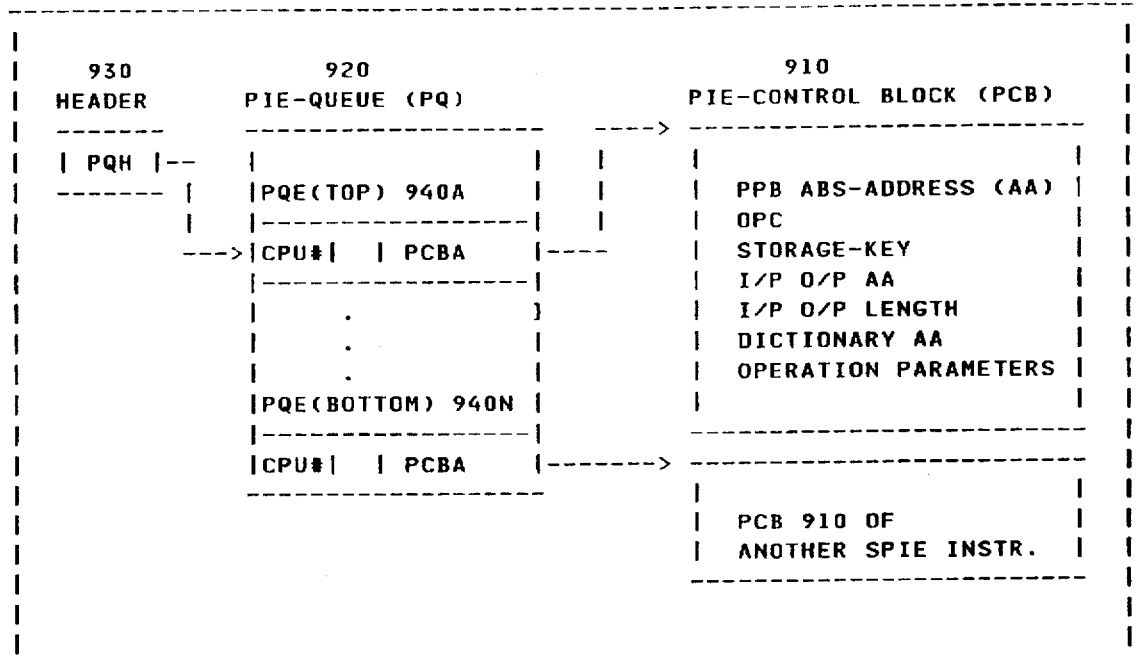
FIG. 9 illustrates a layout of a hardware system area located in a random-access memory for the preferred embodiment of this PIE facility. This embodiment enables the subsystem executing on a processor to logically own a PIE facility that belongs exclusively to that processor, although this PIE facility may be implemented as shared hardware used by all the processors in that system.

FIGS. 8A, 8B and 8C illustrate examples in which the DB2 programming subsystem (executing in the processing unit (CPU) 110) performs predicate evaluation of a record (I) in parallel with the PIE facility doing expansion of a next record (I+1). Before CPU 110 can start to execute the DB2 predicate evaluation software on a next record, the CPU must executes DB2 software containing a SPIE test "completion" command to find if the PIE facility has completed expanding that record. This SPIE test completion command execution in the CPU examines the status of PHB field S 320 (in FIG. 3) for existence of the "operation complete" code (11), which the PIE facility sets as soon as it completes the record expansion.

Accordingly, if this SPIE test command by the CPU finds the record expansion was completed by the PIE facility, the CPU may then attempt to execute predicate evaluation software on the record, since the CPU should only execute the predicate evaluation software on an expanded record (in its uncompressed state).

FIG. 8A represents the normal case where the CPU finds the record-expansion has been completed for the next record by the PIE facility while the CPU software (DB2) is executing its predicate evaluation software on the prior expanded record. Hence, record (I) is done first. Then record (I+1), and then record (I+2), followed by record (I+3).

In FIG. 8B, the CPU's SPIE test command finds that the record-expansion of record (I+1) has not been completed by the PIE facility, so the CPU must wait until the expansion is completed. Instead of the CPU waiting for the SPIE facility to complete the record expansion, the CPU then has the following options a) and b):

a) Halt (stop) the PIE facility's record-expansion processing of its current record (I+1) by the CPU executing SPIE instruction containing the HALT command. Then the CPU must execute the CMPSC instruction to expand the rest of record (I+1). But first the CPU will issue an SPIE recordexpand command to start the expansion of the next record (I+2) to obtain the PIE facility's overlap of expanding the the next record (I+2) while the CPU is finishing the expansion of record (I+1) and then executing its predicate evaluation. FIG. 8B illustrates this halt type of processing of sequential records in a data base management system (DBMS) which requires that records must be processed in order.

Table A in the APPENDIX shows detailed pseudo-code logic for doing such processing.

b) This option can be used when a DBMS does not require that its records be processed in order. This option let the PIE facility continue its expansion of record (I+1) to completion without any halting of it. Instead of waiting for completion of record (I+1), the CPU does the processing for the expansion of the next record (I+2) by executing the synchronous CMPSC instruction, after which the CPU does predicate evaluation processing on expanded record (I+2). By then, the PIE facility processing of record (I+1) may be completed, so that the CPU can execute its predicate processing of record (I+1) as soon as its processing of record (I+2) is complete.

This out-of-order processing sequence allows the PIE facility to perform expansion processing to completion on alternate records, with the other alternate records having expansion processed by the CPU. FIG. 8C represents this type of out-of-order processing.

Table B in the APPENDIX shows detailed pseudo-code logic for doing such processing.

DESCRIPTION OF LOGIC IN APPENDIX
TABLE A

It is assumed that there is at least one record in the page. The first record is expanded synchronously with CMPSC, and if there are no more records, then this expanded record is processed, and the logic EXITs. If there are more records, PPB is initialized in storage and a SPIE operation is started for the next record. The expanded record is processed.

If the SPIE operation is unsuccessful, control is transferred to the first-level 'else' location in the bottom portion of the pseudo-code. The next record is expanded synchronously via CMPSC instruction and the whole operation is repeated by returning control to 'Loop'. If the SPIE operation is successful, there are three conditions. The asynchronous operation is complete, or it is ongoing, or it has been interrupted. If complete, the next record is setup for the SPIE operation, and control returns to 'Loop' to repeat the process. If the operation is ongoing SPIE HALT is executed to stop the operation with a checkpoint, and now this halted record looks like an interrupted record. Expansion of this interrupted record (interrupted or halted) is completed synchronously via CMPSC instruction, and control is returned to 'Loop' to repeat the whole process.

The following simplifications are assumed in the pseudo-code described in Table A and Table B to keep the description simple and readable.

The detection and processing of Overflow-Records in a DB2 page are not discussed.

To keep the Pseudo-Code simple, the model assumed that the asynchronous SPIE operations and the synchronous CMPSC operations complete successfully.

Error cases and error handling are not discussed.

Cases when DB2 'suspends' a task are not discussed. However, it would be DB2's responsibility to HALT the operation prior to suspending its task.

DESCRIPTION OF LOGIC IN APPENDIX TABLE B

An array called Proc-Array is defined, whose size is the number of maximum possible records within a DB2 page. For each record, one bit is specified, called the Row-proc Bit: This is the row-processed bit. When this bit is 0, it indicates that the predicate evaluation operation for this record is not complete. When this bit is 1, it indicates that the predicate evaluation operation for this record is complete.

Proc-Array is initialized to zeroes. After doing predicate evaluation of one record, the completion status of the asynchronous SPIE operation is checked. There are 3 possibilities for the completion of this SPIE operation:

The asynchronous SPIE operation is complete (PPB<S>= 11). In this case, an unprocessed record (a record for which neither expansion nor predicate-evaluation has been done) is found, the asynchronous SPIE operation for this record is initiated, and predicate-evaluation of the record for which asynchronous SPIE operation completed is done.

If there is no more record left for which to initiate the SPIE operation, predicate evaluation is done of the record for which the SPIE operation was completed, and the logic EXITs.

The asynchronous SPIE operation got interrupted (PPB<S>=01).

If there are other unprocessed records left, then SPIE for the same record is re-initiated, thus continuing from the point of interruption. Another record for which expansion has not been done is found, expansion is done synchronously using CMPSC and then predicates are evaluated. After the predicate evaluation, the completion of the SPIE operation is checked again.

If there is no more unprocessed record left in the page synchronous expansion (CMPSC) is done from the interrupted checkpoint for rest of the bytes within the record, predicate evaluation of the record is done, and the logic EXITs.

The asynchronous SPIE operation is still in-progress (PPB<S>=00). If there are other unprocessed records left, then another record is found for which expansion has not been done, expansion is done synchronously using CMPSC and then the predicates are evaluated. After the predicate evaluation, the completion of the SPIE operation is checked again.

If there is no more unprocessed record left in the page, the SPIE operation is HALTed which takes a checkpoint in PPB in storage. Synchronous expansion (CMPSC) is done from the interrupted checkpoint for rest of the bytes within the record, predicate evaluation of the record is done, and the logic EXITs.

PIE FACILITY HARDWARE MODEL

This section describes a preferred hardware embodiment model of this PIE facility in a multiprocessor (MP) system. A MP system has N processors that can be configured differently according to its operating environment. In addition, the Central Electronic Complex (CEC) has Input/Output Processors (IOPs). Each processor and IOP has its own private cache, and all communications among processors and the IOP go through the main storage.

If the IOP is a processor similar as the CPU and has the similar capabilities, another implementation of the PIE facility in the CEC is to off-load the PIE operation from some CPU to the IOP using a SPIE instruction execution, thus allowing the CPU execution of instructions that follows the SPIE, and the IOP execution of the PIE operation, to occur concurrently. In this model, two important issues need to be addressed; first, communication mechanisms between the CPUs and the IOP, and second, the handling of interrupts.

During the synchronous portion of the SPIE instruction execution, the CPU builds a PIE-Control Block (PCB) 910 in the Hardware-System Area (HSA) in storage which is available to processor microcode but is not available to programs whether privileged or unprivileged. Also, Subchannel-Control Blocks (SCBs), one per I/O device, are located here. Each PCB 910 is uniquely associated with one CPU in the configuration. The function of each PCB(i) is similar to the function of the SCB; the PCB contains information about the current status of the PIE operation issued by CPU(i) and being executed by the IOP hardware.

In order for the IOP to locate a PCB during a PIE operation, an active PCB 910 is queued on a PIE-Queue (PQ) 920, and this PQ is located by a PIE-Queue-Header (PQH) 930. This new queue 920 is in addition to three existing types of queues (not shown) in prior commercial IBM S/390 systems: a Work-Queue Header (WQH), a Control-Unit Header (CUH), and an Interrupt-Queue Header (IQH), each locating to a respective queue.

As previously disclosed herein, the PIE facility for a particular CPU may be in one of two states (indicated in the PPB 210 associated with a currently executing SPIE instruction): available or busy. In this implementation, the busy state indicates that there is a PIE-Queue Entry (PQE) 940 A through N with the same CPU# in the HSA PQ 920. This PQE may be in one of two states; "wait" or "active". The wait state indicates that the PQE is waiting to be processed by an IOP, and the active state indicates that the PQE is being processed by the IOP. The PQ is a FIFO queue, and with a single IOP model implementation, the top PQE is most likely to be in the active state, and currently being processed by IOP.

To off-load a record-expand PIE operation to the PIE facility, the DB2 subsystem sets up the PPB in processor storage with appropriate parameters and then the SPIE instruction is executed with the second-operand of the SPIE instruction pointing to this PPB. During the synchronous part of the SPIE instruction execution, the PQ is checked to determine if any PQE is from the same CPU.

If no PQE is found with the same CPU-number (CPU#), the PIE facility for that particular CPU is in the available state. The CPU performs all parameter checkings. All real-addresses are converted to their corresponding absolute-addresses. A PCB is created in the HSA; PCB entries are PPB absolute-address, Operation-Code (OPC) from PPB, Storage-Key from the processor PSW, input and output data starting absolute-addresses, input and output length in bytes, and the operation-parameters from PPB. This PCB PIE operation is enqueued in the PQ, with the PQE containing the CPU#, the pointer to the PCB, and additional state flags (not shown in the figure). This PQE is set to the wait state, and the PIE facility for this CPU is set to the busy state. A signal is sent to the IOP to indicate that there is a new SPIE operation enqueued in the PQ. The synchronous part of the SPIE instruction is complete, and control is returned to the software with a condition-code 0. The CPU is free and may continue with the execution of other instructions.

If, during the synchronous portion of the SPIE instruction execution, a PQE is found in PQ with the same CPU#, the PIE facility for that particular CPU is in the 'busy' state. The synchronous part of the SPIE instruction is complete, and control is returned to the software with a condition-code 1. If the processor is unable to carry out the operation, then control is returned to software with a condition-code other than 0 or 1. The CPU is free and may continue with the execution of other instructions.

When the IOP is ready to take the next queued SPIE operation from the PQ, it will check the PQH for the next PQE that it should work on. Information in the PCB pointed to by the PQE is copied into the local memory of the IOP, and this PQE is set to the 'active' state. Based on the operation-parameters, the IOP performs the required record-expand function. When the operation is complete successfully or unsuccessfully, PHB<S> is set to 11, the appropriate exception flags are set in the PRB, and the PHB is updated to reflect the current checkpoint. The PCB is copied back from the IOP local memory to the PCB location in the HSA (Note: The copying of PCB back to HSA may not necessary). The PCB is released, and the PQE is removed from the PQ. The PIE facility for this CPU is set to the 'available' state.

When a CPU is interrupted (page-fault, I/O exception, etc.), the CPU checks the PQ in HSA to determine if there is any waiting SPIE request or any on-going SPIE operation in the IOP that is issued by this CPU. If a PQE is found with the same CPU#, and if the PQE is in the wait state, the PQE is removed from the PQ. If the PQE is in the active state, the PQE is removed from the PQ and a signal is sent to the IOP to halt the current IOP operation. In either case, PHB<S> is set to 01, indicating an interrupted completion. The PIE facility for this CPU is set to the available state.

For I/O interrupts, another implementation model is feasible. When a channel subsystem and the device generate status conditions, the IOP enqueues an entry in the interrupt queue, and this provides a means for the CPU to change its state in response to conditions that occur at I/O devices or subchannels. The IOP has no knowledge of which CPU in the configuration accepts and processes the I/O interruption, and hence, in this PIE facility model, the IOP interrupts all the PIE operations, waiting and active, at the time this interrupt is generated. The PQ is cleared of all entries and the status of all these entries in their respective PPBs are set to reflect an interrupted process. The ongoing PIE operation is halted.

When multiple IOPs are configured, each PQE contains an IOP number field also; and the number of the IOP associated with the current SPIE instruction is entered therein. Then the CPU and IOP operations are accordingly like those described above with the addition of the IOP number association.

PO994036

APPENDIX

TABLE A

```
/*---------------------------------------------------------------------*/
/* PSEUDO-CODE I1 - ROWS IN A PAGE ARE PROCESSED IN-ORDER              */
/*                                                                     */
/*---------------------------------------------------------------------*/
   Curr-Row# = First-Row              /* Curr-Row#: row# for predicate eval */
   CMPSC Rec(Curr-Row#)               /* First row is synchronously expanded*/
   Iexp# = Next(Curr-Row#)            /* Iexp#: row# which is being SPIEd   */
   If No-More Rec                     /* Only 1 record in the page          */
   | Pred-Eval Rec(Curr-Row#)         /* Process the expanded record        */
   | EXIT                             /* Done! Short-n-Simple!!             */
                                      /* >1 rec/page. Start SPIE Rec(Iexp#) */
Loop:
   Spie-Started = No                  /* Flag for SPIE condition code 1     */
   Setup PPB for SPIE                 /* Operation parameters in storage    */
   SPIE Rec(Iexp#)                    /* Start expansion of next record     */
   If Condition-Code=0                /* SPIE successful                    */
     Spie-Started = Yes               /* Flag for SPIE condition code 1     */
   Pred-Eval Rec(Curr-Row#)           /* Process the expanded record        */
   If Spie-Started = Yes              /* SPIE was started successfully      */
   |  /*-----------------------------------------------------------------*/
   |  /* CHECK THREE POSSIBLE CONDITIONS OF ALREADY INITIATED SPIE       */
   |  /*    Condition 1: PPB<S>=11 Operation complete                    */
   |  /*-----------------------------------------------------------------*/
   |  If PPB<S>=11                    /* Operation complete                 */
   |  | Curr-Row# = Iexp#             /* Do Pred-Eval of this row next      */
   |  | Iexp# = Next-Row(Iexp#)       /* Setup for expanding next record    */
   |  | If No-More Rec                /* No more records in the page        */
   |  | | Pred-Eval Rec(Curr-Row#)    /* Last record predicate evaluation   */
   |  | | EXIT                        /* Done                               */
   |  | Else                          /* More records: continue             */
   |  | | Go to Loop                  /* Initiate SPIE and then Pred-Eval   */
   |  Else                            /* Operation not complete             */
   |  | /*---------------------------------------------------------------*/
   |  | /* Condition 2: PPB<S>=00 Operation still in progress            */
   |  | /* Condition 3: PPB<S>=01 Operation interrupted                  */
   |  | /*---------------------------------------------------------------*/
```

PO994036

TABLE A (Continued)

```
| | If PPB<S>=00               /* Operation started (in-progress) */
| | | SPIE HALT Rec(Iexp#)     /* Checkpoint current SPIE operation */
| | | Curr-Row# = Iexp#        /* Interrupted or halted (S=01) */
| | | CMPSC Rec(Curr-Row#)     /* Expand rest of record synchronously*/
| | | Iexp# = Next-Row(Iexp#)  /* Setup for expanding next record */
| | | If No-More Rec           /* Process last record in the page */
| | | | Pred-Eval Rec(Curr-Row#) /* Do predicate evaluation */
| | | | EXIT                   /* Done */
| | | Else                     /* More records: continue */
| | |   Go to Loop             /* Initiate SPIE and then Pred-Eval */
Else                           /* SPIE failed on Rec(Iexp#) */
| Curr-Row# = Iexp#            /* Update one record */
| CMPSC Rec(Curr-Row#)         /* Expand record synchronously */
| Iexp# = Next-Row(Iexp#)      /* Setup for expanding next record */
| If No-More Rec               /* Process last record in the page */
| | Pred-Eval Rec(Curr-Row#)   /* Do predicate evaluation */
| | EXIT                       /* Done */
| Else                         /* More records: continue */
|   Go to Loop                 /* Try SPIE on Iexp'th record */
```

PO994036

TABLE B

```
/*---------------------------------------------------------------------*/
/* PSEUDO-CODE 1 - ROWS IN A PAGE CAN BE PROCESSED OUT-OF-ORDER        */
/*                e.g. Tablespace Scan                                 */
/*---------------------------------------------------------------------*/
   Init Proc-Array to Zeroes              /* No records processed       */
   Curr-Row# = First-Row                  /* Curr-Row# row for pred-eval*/
   CMPSC Rec(Curr-Row#)                   /* First row is sync expanded */
   Iexp# = Next(Curr-Row#)                /* Iexp# row being SPIEd      */
   If No-More Rec                         /* Only 1 record in the page  */
   | Pred-Eval Rec(Curr-Row#)             /* Process expanded record    */
   | EXIT                                 /* Done! Short-n-Simple!!     */
Loop1:                                    /* >1 rec/page SPIE Rec(Iexp#)*/
   Spie-Started = No                      /* SPIE cond-code 1 flag      */
   Setup PPB for SPIE                     /* Operation parameters       */
   SPIE Rec(Iexp#)                        /* Start expand of next rec   */
   If Condition-Code=0                    /* SPIE successful            */
      Spie-Started = Yes                  /* SPIE cond-code 1 flag      */
Loop2:                                    /* Process & test SPIE status */
   Pred-Eval Rec(Curr-Row#)               /* Process the expanded record*/
   Proc-Array.Row-proc(Curr-Row#) = Yes   /* Record processed bit       */
   If Spie-Started = Yes                  /* SPIE was started ok        */
   |/*------------------------------------------------------------------*/
   |/* CHECK THREE POSSIBLE CONDITIONS OF ALREADY INITIATED SPIE        */
   |/*    Condition 1: PPB<S>=11 Operation complete                     */
   |/*------------------------------------------------------------------*/
   | If PPB<S>=11                         /* Operation complete         */
   | | Curr-Row# = Iexp#                  /* Pred-Eval this row next    */
   | | Iexp#=Next-Row(Proc-Array)         /* Next rec from Proc-Array   */
   | | If No-More Rec in Proc-Array       /* No more records in page    */
   | | | Pred-Eval Rec(Curr-Row#)         /* Pred-eval for last record  */
   | | | EXIT                             /* Done                       */
   | | Else                               /* More records: continue     */
   | |    Go to Loop1                     /* Initiate SPIE and Pred-Eval*/
   | Else                                 /* Operation not complete     */
   | |/*----------------------------------------------------------------*/
   | |/* Condition 2: PPB<S>=01 Operation interrupted                   */
   | |/*----------------------------------------------------------------*/
```

TABLE B (Continued)

```
| | If PPB<S>=01                        /* Operation interrupted      */
| | |   PPB<S>=00                       /* Set operation started      */
| | |   SPIE Rec(Iexp#)                 /* SPIE on interrupted rec    */
| | |   If Condition-code = 1           /* Could not initiate SPIE    */
| | | |   CMPSC Rec(Iexp#)              /* Expand rest of the record  */
| | | |   Curr-Row# = Iexp#             /* Pred-Eval this row next    */
| | | |   Iexp#=Next-Row(Proc-Array)    /* Next rec from Proc-Array   */
| | | |   If No-More Rec in Proc-Array  /* No more records in page    */
| | | | | /*-----------------------------------------------------------*/
| | | | | /* Implies that the only record left is the one for which    */
| | | | | /* we re-initiated SPIE                                      */
| | | | | /*-----------------------------------------------------------*/
| | | | |   Pred-Eval Rec(Curr-Row#)    /* Pred-eval for last record  */
| | | | |   EXIT                        /* Done                       */
| | | |   Else                          /* More records: continue     */
| | | |     Go to Loop1                 /* Initiate SPIE and Pred-Eval*/
| | |   Else                            /* SPIE successful            */
| | | |   Curr-Row#=Next-Row(Proc-Array)/* Next record from Proc-Array*/
| | | |   If No-More Rec in Proc-Array  /* No more records in page    */
| | | | | /*-----------------------------------------------------------*/
| | | | | /* Implies that the only record left is the one for which    */
| | | | | /* we re-initiated SPIE. We halt it.                         */
| | | | | /*-----------------------------------------------------------*/
| | | | |   SPIE HALT Rec(Iexp#)        /* Checkpoint SPIE operation  */
| | | | |   CMPSC Rec(Iexp#)            /* Expand rest of the record  */
| | | | |   Pred-Eval Rec(Iexp#)        /* Pred-eval for last record  */
| | | | |   EXIT                        /* Done                       */
| | | |   Else                          /* More records: continue     */
| | | | |   CMPSC Rec(Curr-Row#)        /* Synchronous expand record  */
| | | | |   Go to Loop2                 /* Process expanded record    */
| |   Else                              /* Operation in-progress      */
| | |
| | |
| | | /*-------------------------------------------------------------*/
| | | /* Condition 3: PPB<S>=00 Operation in-progress                */
| | | /*-------------------------------------------------------------*/
```

TABLE B (Continued)

```
| | | If PPB<S>=00                        /* Operation in progress       */
| | | | Curr-Row#=Next-Row(Proc-Array)    /* Next record from Proc-Array*/
| | | | If No-More Rec in Proc-Array      /* No more records in page    */
| | | | |/*-------------------------------------------------------------*/
| | | | | /* Implies that the only record left is the one for which    */
| | | | | /* we re-initiated SPIE. We halt it.                         */
| | | | |/*-------------------------------------------------------------*/
| | | | | SPIE HALT Rec(Iexp#)            /* Checkpoint SPIE operation  */
| | | | | CMPSC Rec(Iexp#)                /* Expand rest of the record  */
| | | | | Pred-Eval Rec(Iexp#)            /* Pred-eval for last record  */
| | | | | EXIT                            /* Done                       */
| | | | Else                              /* More records: continue     */
| | | | | CMPSC Rec(Curr-Row#)            /* Synchronous expand record  */
| | | | | Go to Loop2                     /* Process expanded record    */
                                          /* SPIE failed on Iexp# record*/
Else
| Curr-Row#=Next-Row(Proc-Array)          /* Next unprocessed record    */
| If No-More Rec in Proc-Array            /* No more records in page    */
| | /*-----------------------------------------------------------------*/
| | /* Check if Iexp'th record has been processed                      */
| | /*-----------------------------------------------------------------*/
| | If (Proc-Array.Row-proc(Iexp#)= No  /* Iexp'th rec not processed   */
| | | CMPSC Rec(Iexp#)                    /* Synchronous expand this one*/
| | | Pred-Eval Rec(Iexp#)                /* Pred-eval for last record  */
| | EXIT                                  /* Done                       */
| Else                                    /* More records: continue     */
| | CMPSC Rec(Curr-Row#)                  /* Synch expand next one      */
| | Go to Loop1                           /* Try SPIE on Iexp'th record */
```

Having thus described our invention, what we claim as new and desire to secure by Letters Patent is:

1. A method of operating a processor electronic complex (CEC) containing at least a Central Processing facility (CPU) and a parallel-instruction-execution processing facility (PIE-PF) and a shared memory, comprising the steps of:

initializing by the CPU executing a supervisory program of a PIE parameter block (PPB) for communicating information between the CPU and the PIE-PF for enabling the CPU to control the PIE-PF to share execution of a program of instructions on the same set of data, executing by the CPU a start parallel instruction execution (SPIE) instruction in supervisory state to signal to the PIE-PF if a PIE Queue Element (PQE) assigned to the PIE-PF is available for CPU use in shifting to the PIE-PF execution of the program on a set of data provided to the CPU, but ending the SPIE instruction execution by the CPU if the PQE is busy, synchronously continuing execution of the SPIE instruction if the PQE is available by setting an address of a control block (PPB) in the PQE and signalling the PIE-PF to examine the PPB for a SPIE processing operation code for controlling a PIE-PF processing operation, completing execution by the CPU of the SPIE instruction when the CPU has set fields in the PPB for data to be processed by the executing SPIE instruction, asynchronously executing on the data by the PIE-PF of a SPIE processing operation indicated by an SPIE processing operation code in the PPB after the PIE-PF examines the SPIE processing operation code and PIE processing parameter information in the PPB, setting by the PIE-PF of status information in the PPB about the PIE-PF processing operation as the PIE-PF completes the processing operation to enable a communication of status of the PIE-PF processing operation to the CPU, and indicating by the PIE-PF to the CPU of availability of the PQE for CPU use upon completion of the processing operation on the data by the PIE-PF.

2. A method of operating a parallel-instruction execution processing facility having an associated CPU and a shared memory as defined in claim 1, further comprising the step of:

interrupting and checkpointing the processing operation currently being performed by the PIE-PF and the CPU if the CPU accepts an interruption signal to terminate execution of the program currently being performed by the CPU and the PIE-PF.

3. A method of operating a parallel-instruction-execution processing facility having an associated CPU and a shared memory as defined in claim 1, further comprising the steps of:

not initiating the asynchronously executing step if the synchronously continuing execution step finds the PQE is busy to prevent the SPIE instruction from shifting execution to the PIE-PF of the program on current data, returning a condition code to the program to inform the CPU that the SPIE instruction did not complete execution, and executing another instruction on the CPU.

4. A method of operating a parallel-instruction execution processing facility having an associated CPU and a shared memory as defined in claim 1, further comprising the steps of:

initializing a test command by the CPU for determining availability of the PQE by writing an operation code in a PIE parameter block (PPB), executing by the CPU of a SPIE instruction in supervisory state if the PQE is available to signal for the PIE-PF to examine an operation code field in the PPB and set status information in the PPB if the PQE is available for CPU use, but ending the SPIE instruction execution by the CPU the PQE is busy, not initiating the asynchronously executing step if the synchronously continuing execution step finds a test operation code in the operation code field in the PPB, returning a completion condition code to the program indicating if a completion status exits for the SPIE instruction, and executing another instruction in the CPU if a completion condition code is returned.

5. A method of operating a parallel-instruction execution processing facility having an associated CPU and a shared memory as defined in claim 4, further comprising the steps of:

initializing a halt command operation by the CPU by writing a halt operation code in a PIE parameter block (PPB), executing by the CPU of a SPIE instruction in supervisory state to signal to the PIE-PF to examine the halt operation code in the PPB and to set status information in the PPB to indicate if the PQE is available for CPU use, but ending the SPIE instruction execution by the CPU if the PQE is busy, halting any processing operation in the PIE-PF, and not initiating the asynchronously executing step, returning a condition code to the program indicating a completion status for the SPIE instruction, and executing another instruction in the CPU.

6. A method of operating a parallel-instruction-execution processing facility having an associated CPU and a shared memory as defined in claim 4, further comprising the steps of:

accessing by the CPU of a data entity in a large data base, testing by the CPU for PQE availability, and issuing by the CPU of a SPIE instruction for requesting the PIE-PF to processing the data entity if the PQE is available, and then processing the data entity by the PIE-PF, accessing a next data entity by the CPU, and testing the PQE for availability of the PIE-PF for processing the next data entity, testing by the CPU for PQE availability, and issuing by the CPU of a SPIE instruction for requesting the PIE-PF to processing the next data entity if the PQE is available, but processing by the CPU of the next data entity if the PQE is busy to indicate the PIE-PF has not yet completed processing of the data entity for which processing was started prior to the processing of the next data entity.

7. A method of operating a parallel-instruction execution processing facility having an associated CPU and a shared memory as defined in claim 5, further comprising the steps of:

accessing by the CPU of a data entity in a large data base, testing by the CPU for PQE availability, and issuing by the CPU of a SPIE instruction for requesting the PIE-PF to partially or wholly process the data entity if the PQE is available, and then processing the data entity by the PIE-PF, but halting and checkpointing the processing of the data entity by the PIE-PF if the PQE is busy or is incomplete, accessing a next data entity by the CPU in the large data base, testing by the CPU for PQE availability and issuing by the CPU of a SPIE instruction for requesting the PIE-PF to processing the next data entity if the PQE is available, and then initiating processing of the next data entity by the PIE-PF, and processing by the CPU of the remainder of a data entity from where the data entity was checkpointed when its processing by the PIE-PF was halted, the remainder of processing by the CPU being in parallel with processing of the next data entity by the PIE-PF.

8. A method of operating a parallel-instruction-execution processing facility having an associated CPU and a shared memory as defined in claim 1, further comprising the steps of:

associating one of the PIE-PFs with one of the CPUs in the CEC, enabling CPU execution of the SPIE instruction on each of the plurality of CPUs associated with any of the PIE-PFs in the CEC, providing a queue having a respective PQE assigned to each of the PIE-PFs as an interface between asynchronous operation by the PIE-PF and synchronous operation by its associated CPU, testing by any CPU for availability of the associated PQE prior to executing the SPIE instruction on the CPU, and communicating by the SPIE instruction location of a control block in a memory shared by the CPU and the PIE-PF if the PQE is available, processing by the PIE-PF data identified by the control block (PPB) associated with a program provided for execution by the CPU the SPIE instruction only on the PIE-PF assigned to the CPU if the PQE is available.

9. A method of operating a parallel-instruction-execution processing facility having an associated CPU and a shared memory as defined in claim 1, further comprising the step of:

providing the control block (PPB) as a plurality of control block sections in the shared memory, including: a PIE header block (PHB) containing an operation code field stored by the CPU, a PIE specification block (PSB) containing processing specification parameters stored by the CPU for use by the PIE-PF, and a PIE response area (PRB) containing status information stored by the PIE-PF for the CPU.

10. A method of operating a processor electronic complex (CEC) containing at least a CPU and a parallel-instruction-execution processing facility (PIE-PF) and a shared memory, as defined in claim 1, further comprising the steps of:

initializing by the CPU of a plurality of control blocks (PPBs) in the shared memory for communicating SPIE instruction operations between a CPU and an associated PIE-PF, the PPB comprised of: a PIE header block (PHB), a PIE specification block (PSB), and a PIE response area (PRB), executing by the associated PIE on data located by the PPB in the shared memory when the associated PIE reads the PQE while the PQE indicates an available state for the PIE-PF to start PIE-PF processing of a particular SPIE command as indicated by the state of an operation code in the PHB, communicating status to the CPU and by the PIE-PF through the PPB by: the PIE-PF indicating in a status field in the PPB when the PIE-PF is executing an operation for a start parallel instruction processing instruction (SPIE), or has interrupted an operation executing in the PIE-PF, or has completed an operation by indicating the status in the PHB, and testing by the CPU of field S in the PHB in response to a SPIE being executed by the CPU with the operation code is set to a test command state to determine a next SPIE instruction operation by the CPU.

11. A method of operating a processor electronic complex (CEC) containing at least a CPU and a parallel instruction-execution processing facility (PIE-PF) and a shared memory as defined in claim 10, the CPU executing step further comprising the steps of:

executing on the CPU instructions of a software subsystem to control issuance of SPIE commands for starting, controlling, and halting associated parallel processing by the PIE-PF.

12. A method of operating a parallel-instruction execution processing facility having an associated CPU and a shared memory as defined in claim 1, further comprising the steps of:

interfacing the PIE-PF only to an associated CPU without interfacing the PIE-PF to any input/output (I/O) facility, performing I/O functions by the CPU for both the CPU and the PIE-PF, reading into a memory shared by the CPU and the associated PIE-PF of data entities from a large data base for processing by the CPU and by the PIE-PF when requested by the CPU issuing SPIE instructions for controlling operations on data shared by the CPU with the PIE-PF in the shared memory.

13. A method of operating a processor electronic complex (CEC) containing at least a CPU and a parallel instruction-execution processing facility (PIE-PF) and a shared memory as defined in claim 1, the CPU executing the further steps of:

executing instructions of a software subsystem to control issuance of SPIE commands for starting, controlling, and halting associated parallel processing by the PIE-PF without the use of any I/O facility in an interface between the CPU and the PIE-PF, and executing by the CPU on data in shared memory previously processed by the PIE-PF if a current PHB indicates an operation completion state for the PIE-PF in response to an SPIE test instruction by the CPU.

* * * * *